(12) United States Patent
Alfakhrany et al.

(10) Patent No.: US 9,644,854 B2
(45) Date of Patent: May 9, 2017

(54) ROTOR VENTILATOR

(71) Applicant: CSR Building Products Limited, North Ryde, New South Wales (AU)

(72) Inventors: Tarek Alfakhrany, Melrose Park (AU); Colin Schwecke, Westleigh (AU); Derek Munn, Roseville Chase (AU)

(73) Assignee: CSR Building Products Limited, North Ryde, New South Wales (AU)

( * ) Notice: Subject to any disclaimer, the term of this patent is extended or adjusted under 35 U.S.C. 154(b) by 0 days.

(21) Appl. No.: 14/426,789

(22) PCT Filed: Sep. 9, 2013

(86) PCT No.: PCT/AU2013/001022
§ 371 (c)(1),
(2) Date: Mar. 9, 2015

(87) PCT Pub. No.: WO2014/036613
PCT Pub. Date: Mar. 13, 2014

(65) Prior Publication Data
US 2015/0219347 A1 Aug. 6, 2015

(30) Foreign Application Priority Data

Sep. 7, 2012 (AU) ................................ 2012903906

(51) Int. Cl.
*F24F 7/02* (2006.01)
*F24F 13/20* (2006.01)
(Continued)

(52) U.S. Cl.
CPC .............. *F24F 7/025* (2013.01); *F24F 7/065* (2013.01); *F24F 13/20* (2013.01); *F24F 2013/205* (2013.01)

(58) Field of Classification Search
None
See application file for complete search history.

(56) References Cited

U.S. PATENT DOCUMENTS

| 1,702,120 | A | * | 2/1929 | Kimball | ................. | F23L 17/10 |
| | | | | | | 454/19 |
| 1,773,453 | A | * | 8/1930 | Flettner | .................. | F23L 17/10 |
| | | | | | | 454/117 |

(Continued)

FOREIGN PATENT DOCUMENTS

| GB | 1098241 A | 1/1968 |
| GB | 2378750 A | 2/2003 |

(Continued)

OTHER PUBLICATIONS

International Search Report for PCT/AU2013/001022 dated Dec. 2, 2013 (6 pages).

(Continued)

*Primary Examiner* — Gregory Huson
*Assistant Examiner* — Eric Gorman
(74) *Attorney, Agent, or Firm* — Michael Best & Friedrich LLP

(57) ABSTRACT

A rotor ventilator comprising a ventilator stator for mounting to a structure and a ventilator rotor for mounting and rotation with respect to the ventilator stator is disclosed. The ventilator further comprises a cover for positioning over the ventilator rotor and mounting to the ventilator stator. The cover comprises a central portion surrounded by an outer substantially concave portion. The outer concave portion of the cover may protect the ventilator from environmental conditions/elements, such as by redirecting particles, water droplets, debris and dust, etc away from the interior of the ventilator. The outer concave portion may act as a trough, from which the particles can then be directed off the cover. The trough may also act to prevent the particles from escaping over the sides of the cover, and into the ventilator.

32 Claims, 8 Drawing Sheets

(51) Int. Cl.
  *F24F 7/06* (2006.01)
  *E21F 1/08* (2006.01)
  *F03B 3/12* (2006.01)
  *F03D 1/06* (2006.01)
  *F03D 9/00* (2016.01)
  *F24F 11/00* (2006.01)
  *F24F 13/00* (2006.01)

(56) References Cited

U.S. PATENT DOCUMENTS

| | | | | |
|---|---|---|---|---|
| 1,965,171 | A * | 7/1934 | Boyer | F04D 25/022 454/16 |
| 1,977,934 | A * | 10/1934 | Bolton | F23L 17/10 454/18 |
| 2,469,096 | A * | 5/1949 | Wilson | F23L 17/10 454/18 |
| 2,672,087 | A * | 3/1954 | Marr | F24F 13/06 454/308 |
| 2,824,507 | A * | 2/1958 | Alldritt | F24F 7/025 454/356 |
| 3,102,679 | A * | 9/1963 | Rudy | F04D 17/165 415/207 |
| 3,202,080 | A * | 8/1965 | Cook | F24F 7/025 415/211.2 |
| 3,202,342 | A * | 8/1965 | Wasson | F04D 25/166 415/143 |
| 3,220,457 | A * | 11/1965 | Bailey | F23D 11/04 239/222 |
| 3,227,902 | A * | 1/1966 | Laing | B21D 53/267 310/59 |
| 3,270,656 | A * | 9/1966 | Cook | F04D 25/14 415/148 |
| 3,396,652 | A * | 8/1968 | Morrison | E04D 13/0325 454/342 |
| 3,433,145 | A * | 3/1969 | Baker | F04D 25/14 348/E11.011 |
| 3,783,550 | A * | 1/1974 | Andrews | A63F 7/26 446/484 |
| 3,876,925 | A * | 4/1975 | Stoeckert | B60K 16/00 180/2.2 |
| 4,303,375 | A | 12/1981 | Foglesong et al. | |
| 4,390,316 | A * | 6/1983 | Alison | F01D 1/14 415/202 |
| 4,416,415 | A * | 11/1983 | Kolt | F23L 17/10 236/49.5 |
| 4,448,112 | A * | 5/1984 | Soderberg | B60H 1/26 114/211 |
| 4,648,312 | A * | 3/1987 | Schad | F23L 17/10 416/227 A |
| 4,759,272 | A * | 7/1988 | Zaniewski | F23L 17/005 110/162 |
| 4,768,424 | A * | 9/1988 | Frenkler | F04D 25/088 454/341 |
| 5,078,047 | A | 1/1992 | Wimberly | |
| 5,910,045 | A * | 6/1999 | Aoki | F04D 17/02 454/186 |
| 6,191,496 | B1 * | 2/2001 | Elder | F03D 3/0409 290/44 |
| 6,302,778 | B1 * | 10/2001 | Andrews | F03D 3/005 454/16 |
| 6,352,473 | B1 * | 3/2002 | Clark | F23L 17/10 454/18 |
| 6,471,578 | B1 * | 10/2002 | Yang | F23L 17/02 454/20 |
| 6,582,291 | B2 | 6/2003 | Clark | |
| 7,025,670 | B1 | 4/2006 | Robinson | |
| D595,466 | S | 6/2009 | Sofy et al. | |
| 8,251,674 | B1 * | 8/2012 | Pairaktaridis | H02K 9/06 310/62 |
| 9,273,665 | B1 * | 3/2016 | Krippene | F03D 1/04 |
| 2002/0047276 | A1 * | 4/2002 | Elder | F03D 3/0409 290/55 |
| 2003/0025335 | A1 * | 2/2003 | Elder | F03D 3/04 290/55 |
| 2004/0121892 | A1 * | 6/2004 | Zonneveld | B04B 11/06 494/67 |
| 2004/0219019 | A1 * | 11/2004 | Taylor | F03D 3/0409 416/132 B |
| 2005/0164628 | A1 * | 7/2005 | Lee | F04D 25/166 454/341 |
| 2006/0111034 | A1 * | 5/2006 | Parry | F23L 17/02 454/3 |
| 2007/0137243 | A1 * | 6/2007 | Lee | F04D 29/462 62/419 |
| 2008/0112810 | A1 * | 5/2008 | Nagamatsu | F04D 29/281 416/204 R |
| 2010/0278629 | A1 * | 11/2010 | Krippene | F03D 1/04 415/1 |
| 2011/0000206 | A1 * | 1/2011 | Aprad | F02G 1/043 60/517 |
| 2011/0211963 | A1 * | 9/2011 | Bohl | F04D 29/162 416/179 |
| 2012/0045352 | A1 * | 2/2012 | Lawyer | F04D 13/024 417/410.1 |
| 2012/0121396 | A1 * | 5/2012 | Krippene | F03D 1/04 415/182.1 |
| 2012/0138058 | A1 * | 6/2012 | Fu | A61M 16/0066 128/204.23 |
| 2012/0199129 | A1 * | 8/2012 | Kenyon | A61M 16/0066 128/205.25 |
| 2013/0004329 | A1 * | 1/2013 | Shiraichi | F04D 29/282 416/243 |
| 2013/0216358 | A1 * | 8/2013 | Reilly | F03D 3/0409 415/125 |
| 2013/0251560 | A1 * | 9/2013 | Xue | F04D 13/06 417/410.1 |
| 2014/0120818 | A1 * | 5/2014 | Bennett | F24F 7/025 454/16 |
| 2014/0314558 | A1 * | 10/2014 | Tsai | F04D 25/0613 415/206 |
| 2014/0369826 | A1 * | 12/2014 | Rohring | F03D 1/04 415/207 |
| 2016/0084227 | A1 * | 3/2016 | Krippene | F03D 9/002 290/55 |

FOREIGN PATENT DOCUMENTS

WO  2006/032111 A1  3/2006
WO  WO 2011/013105 A2 *  2/2011  ............ F03D 3/00

OTHER PUBLICATIONS

International Search Report for AU2012903906 dated Dec. 22, 2012 (9 pages).
International Preliminary Report on Patentability for PCT/AU2013/001022 dated Jan. 28, 2015 (7 pages).

* cited by examiner

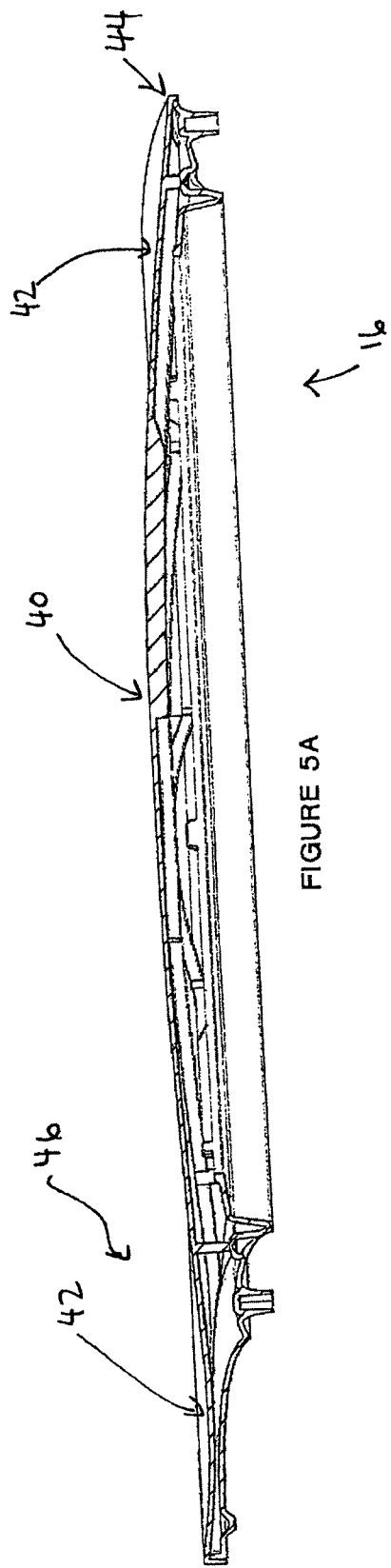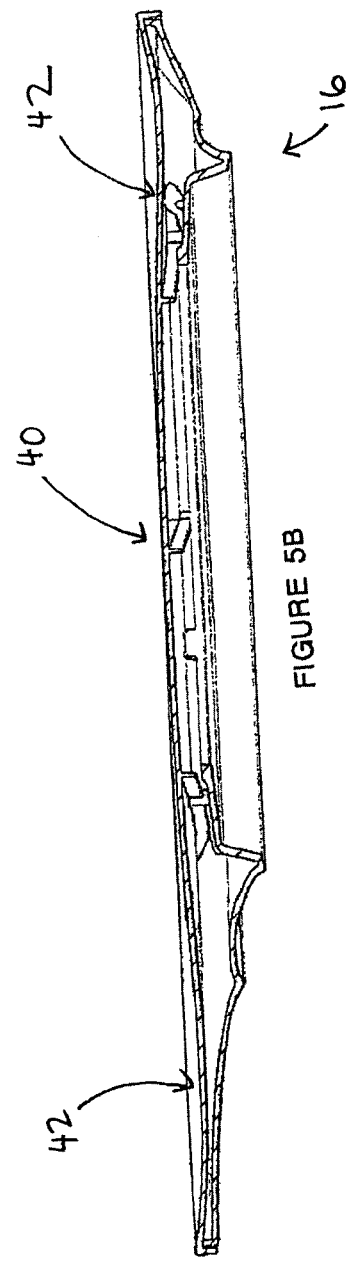

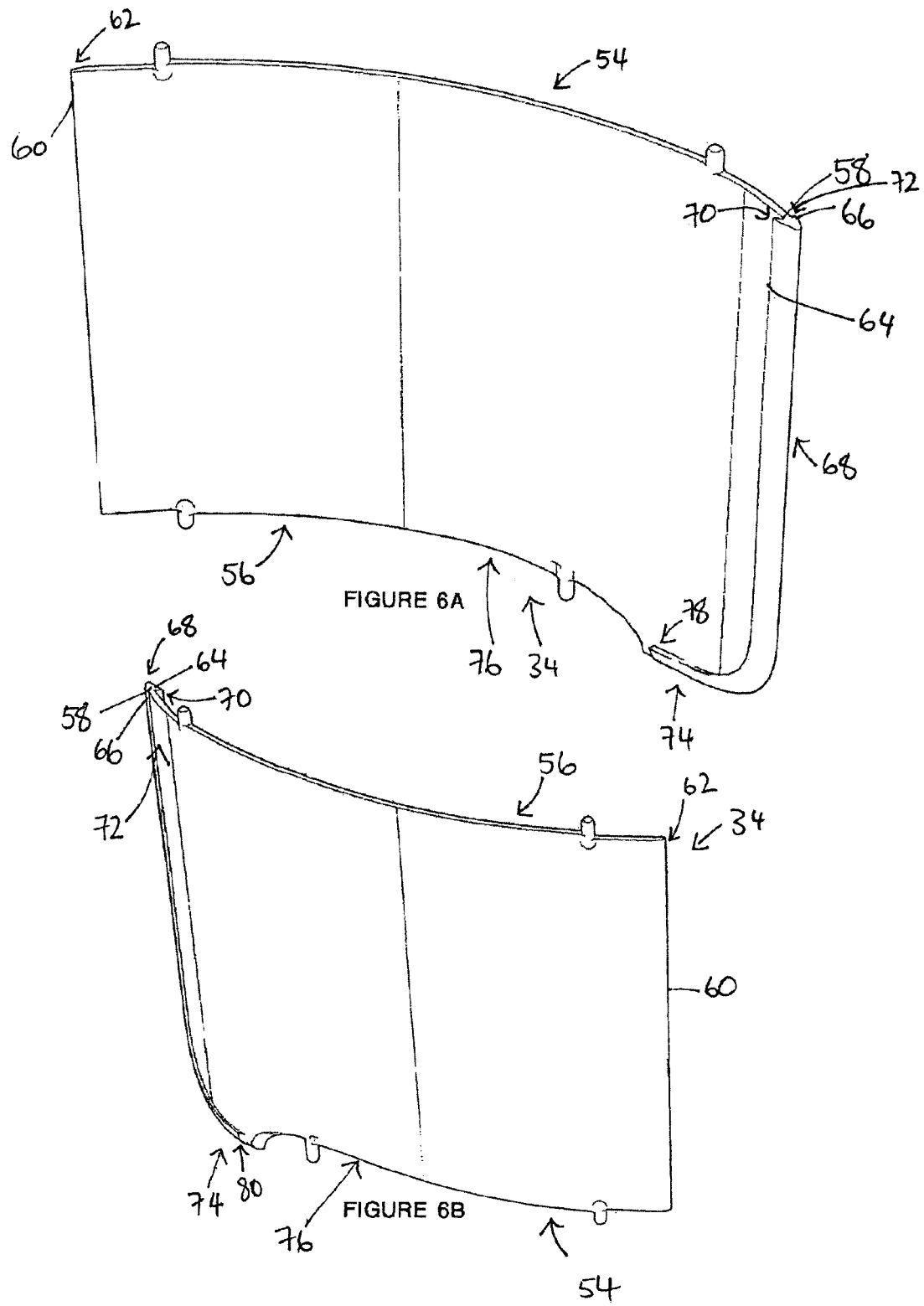

ROTOR VENTILATOR

TECHNICAL FIELD

A rotor ventilator and cover therefor are disclosed. A method of mounting a rotor ventilator is also disclosed. The rotor ventilator, mounting method and ventilator cover may find particular application in roof-mounted ventilators, though they can be employed in other ventilator types, such as wall-mounted ventilators.

BACKGROUND ART

Ventilators can be employed to evacuate air and other gases from enclosed spaces. Such enclosed spaces can include the roof space or interior of commercial and domestic buildings, shipping containers, portable buildings and sheds, automobiles etc. The air and other gases evacuated can include warm or heated gases, moist gases, gas containing contaminants such as contaminated air or toxic fumes, stale gases (especially air) etc.

Various types of wind and/or motor-driven rotor ventilators are known. Static ventilators (i.e. the provision of a vent) are also known. Problems specific to ventilators that are mounted outside a structure are that they are exposed to all of the elements, such as wind, rain, snow, etc. As ventilators are generally used to vent an enclosed space, they must be able to prevent such elements from entering the enclosed space.

The above references to the background art do not constitute an admission that the art forms a part of the common general knowledge of a person of ordinary skill in the art. The above references are also not intended to limit the application of the rotor ventilator, rotor ventilator cover and method as disclosed herein.

SUMMARY

Disclosed herein, in a first aspect, is a rotor ventilator. The ventilator comprises a ventilator stator for mounting to a structure. A typical structure to which the ventilator may be mounted is a roof, or wall etc, of an enclosed space of a building, or portable structure such as a shed, house, automobile, etc. It should be appreciated, however, that the ventilator may be mounted to another structure, or part thereof. The ventilator also comprises a ventilator rotor for mounting and rotation with respect to the ventilator stator. The ventilator further comprises a cover for positioning over the ventilator rotor and mounting to the ventilator stator. The cover comprises a central portion surrounded by an outer substantially concave portion.

The cover may protect the ventilator from environmental conditions/elements, may increase the rigidity of the ventilator, may provide an aerodynamic profile to the ventilator, and may enhance the aesthetics of the ventilator. A cover having an outer concave portion may assist in the redirection of particles, water droplets, debris and dust, away from the interior of the ventilator. The outer concave portion may act as a trough, from which the particles can then be directed off the cover. The trough may also act to prevent the particles from escaping over the sides of the cover, and into the ventilator.

In one form, the central portion may be substantially convex. The central convex portion may also help direct particles into the outer concave portion, preventing accumulation of particles at the centre of the cover.

In one form, the cover may be asymmetrical such that it extends further beyond the ventilator rotor on one side thereof. The cover projecting beyond the ventilator on one side may assist in preventing rain from entering the ventilator. This may be particularly useful when the ventilator is mounted such that the ventilator rotor is substantially parallel to the roofline. As wind or air currents flow over a roof, the airflow will generally be parallel to the roofline. The rotor is therefore able to function more efficiently, as the airflow will strike the rotor more directly than in known natural or hybrid ventilators, which are required to be mounted such that their rotors are substantially parallel to the ground. It also lowers the profile of the ventilator, thus making it more discretely positioned on the structure. The cover can be mounted to the ventilator, such that it extends beyond the ventilator on the high-side of the roof. Such a configuration provides similar protection from particles, such as rain, on all sides of the ventilator whilst reducing the overall size of the cover.

In one form, the cover may further comprise a spout. Such a spout may be formed by part of the outer substantially concave portion of the cover converging at a periphery of the cover. The spout may preferably be located on the lower side of the roofline in use (i.e. on an opposite side of the cover to the extending portion). The spout may be used to direct particles, such as water droplets from rain, which have contacted the cover to be directed off the cover and away from the ventilator. The combination of the trough, formed by the substantially concave portion, and the spout may provide sufficient velocity to direct water off the cover, without it trickling into the interior of the ventilator.

In one form, the ventilator may further comprise one or more mounts for mounting the cover to the ventilator stator. These mounts may also act as guides to direct particles, such as water, down the mounts, away from the interior of the ventilator. The stator of the ventilator may also comprise a peripheral skirt that extends around the ventilator. The skirt may be angled slightly downwardly, in use. This may prevent particles that are reflected off the roof from entering the interior of the ventilator. The mounts may be positioned to extend from the peripheral skirt.

When the ventilator comprises a cover having a spout, an end of the spout may be substantially aligned with one of the mounts. Having the spout aligned with a mount may further direct any water which has insufficient velocity to be propelled off and away from the cover, to be guided down the mount and away from the interior of the ventilator.

In one form, the ventilator may further comprise a channel extending from the interior of the ventilator to the exterior of the ventilator. The channel can be used to redirect any particles that may have entered the interior of the ventilator to the exterior of the ventilator. This can help to minimise the particles that can contact rotary parts or electrical equipment (such as a motor) that may be located in the interior of the ventilator.

In one form, the channel may extend along a bearing or motor support arm to a base wall of the ventilator stator. Adaptation of existing components in a ventilator can minimise the need for additional components to be incorporated into the ventilator, thus maintaining a compact and lightweight design solution.

In one form, the ventilator stator may be mounted to the structure to form a spacing therebetween. The channel may extend to the spacing between the stator and structure, and thus to the exterior of the ventilator and structure. The spacing can provide a simple means for particles to be removed from the ventilator interior, without the need to provide holes in the stator or base, which may otherwise let additional particles into the interior of the ventilator.

In one form, the ventilator rotor may comprise a plurality of blades. The blades may be positioned and configured such that, when the ventilator is viewed in side profile, a line of sight into the interior of the ventilator is substantially restricted or obstructed. Restricting or obstructing the line of sight into the ventilator can reduce or prevent particles from entering the interior of the ventilator. Such particles may include water droplets, debris, dust and light. As there is no direct line of sight between adjacent blades, rain and the like is forced to strike a face of one or more of the blades, thus preventing direct access into the interior of the ventilator. Similarly, irritating flickering of light can be reduced or prevented, as light cannot pass directly into the interior of the ventilator, as is possible with ventilators having line of sight gaps between the rotating blades. This has been particularly problematic in applications where the ventilator has been mounted either directly onto inhabited spaces, or ducted to them.

In one form, the blades may be positioned such that, when the ventilator is viewed in a sectional plan view and a line is taken extending between the leading and trailing edges of a blade, the line is unable to extend uninterruptedly into an interior of the ventilator. The line may intersect with the front blade face of an adjacent blade. As mentioned above, this configuration can prevent particles, such as rain, debris, dust, ambient light, etc, from directly entering the ventilator, as the particles are not able to pass directly through the spacing between adjacent blades. The particles will be forced to strike one of the faces of the various blades, before entering the ventilator.

In one form, the blades may be positioned such that, when viewed in side profile, each blade substantially overlaps with an adjacent blade. This can further minimise the ability of particles to enter into the interior of the ventilator.

Each blade may comprise front and back blade faces. Each blade may also comprise leading and trailing edges. The leading edge is generally considered to be the edge of the blade, when mounted in a ventilator, which is located in the inner part of the ventilator and by which the air, gas or other fluid first passes when extracted by the ventilator. The trailing edge is generally considered to be the edge which is located at the outer portion of the ventilator and is the part by which the air, gas or other fluid that is extracted, exits the ventilator. It should also be understood that the trailing edge is that part of the blade which is directly and first contacted by the wind when the ventilator is a natural or hybrid (combination of wind and powered) ventilator.

The leading edge may comprise a first lip extending along its length on the back blade face. The first lip may provide a surface to obstruct the normal flow of particles, which may have contacted and travelled along the back blade face, from entering the ventilator. This may prevent or reduce the number of particles directly entering the interior of the ventilator in an uncontrolled manner. In this context, "uncontrolled manner" describes the way in which the particles can enter the ventilator at any point along the height of the blade leading edge. The first lip may be used to redirect the particles to a specific region in the ventilator interior, in a controlled manner, which can minimise damage to rotary parts or prevent their entrance into the space being ventilated.

In one form, a channel, or groove, may be formed between the first lip and the back blade face. In this regard, the first lip may extend such that an acute angle is formed between the first lip and the back blade face. This channel can further assist with the collection and redirection of particles that strike the back blade face. The channel can also increase the number of particles which are able to be collected at the lip before the particles begin to flow past an outer edge of the lip.

The first lip may further extend along a portion of an underside edge of the back blade face. This may assist in directing the particles to a position in the ventilator where the least damage can be caused. For example, the lip may extend along the underside edge for about a quarter of the length of the blade, allowing particles to be directed away from a centrally mounted motor or bearings.

Whilst, in one form, the first lip may be a separate component attachable to the blade, in another form, the first lip may be integrally formed with the blade. This can further minimise potential points through which the particles may enter the interior of the ventilator.

In one form, the leading edge may further comprise a second lip, extending along its length on the front blade face. Whilst wind that contacts the ventilator will mostly impinge on the back blade face, particles may still enter the ventilator interior on the front face of the blade (for example, when there is minimal rotation of the blades). Providing the leading edge with a second lip that extends on its front blade face can further assist in the reduction or elimination of particles entering the interior of the ventilator in an uncontrolled manner. The second lip may, in a manner similar to the first lip, provide a surface to obstruct the normal flow of particles, which may have contacted and travelled along the front blade face, from entering the ventilator.

In one form, a channel may be formed between the second lip and the front blade face. The second lip may also extend such that an acute angle is formed between the second lip and the front blade face, similar to the first lip. This channel can also assist with the collection and redirection of particles that strike the front blade face. The channel can also increase the number of particles which are able to be collected at the lip before the particles begin to flow past an outer edge of the lip.

The second lip may also extend along a portion of an underside edge of the front blade face, again to redirect the particles to a specific location in the ventilator. The first and second lips may extend different distances along the back and front blade faces, respectively. For example, the first lip may generally collect more particles than the second lip. It may therefore be preferential to have the greater volume of particles collecting at the first lip to be directed to a different part of the ventilator than the smaller volume of particles collecting at the second lip. Generally, and as will be discussed in further detail below, the first and second lips may extend the same distance along the back and front blade faces, respectively. This allows all of the particles to be directed to a single region in the interior of the ventilator.

In one form, the second lip may be narrower than the first lip. As the front blade face is generally under higher pressures than the back blade face, and due to the direction that wind impinges on the blade, particles are less likely to congregate at the front blade face, and will generally be removed therefrom to the exterior of the ventilator by centrifugal forces. To reduce drag associated with the second lip, and the amount of material required to produce the blade with the second lip (and thus weight), the second lip can therefore be produced to be narrower than the first lip, whilst still ensuring adequate redirection of particles.

Whilst, in one form, the second lip may be a separate component attachable to the blade, in another form, the second lip may be integrally formed with the blade. This can further minimise potential points through which the particles may enter the interior of the ventilator.

In one form, the first and second lips may extend so as to form the leading edge as an aerodynamic edge. This can reduce the amount of drag and exhaust air flow restriction caused by the first and second lips.

The trailing edge may comprise an aerodynamic profile at the front blade face. This can further reduce drag caused by the presently disclosed blade.

Also disclosed herein, in a second aspect, is a rotor ventilator. The ventilator comprises a ventilator stator for mounting to a structure. A typical structure to which the ventilator may be mounted is a roof, or wall etc, of an enclosed space of a building, or portable structure such as a shed, house, automobile, etc. It should be appreciated, however, that the ventilator may be mounted to another structure, or part thereof, such as a sub-floor structure. The ventilator also comprises a ventilator rotor for mounting and rotation with respect to the ventilator stator. The ventilator rotor comprises one or more wind-drivable elements. The ventilator further comprises a cover for positioning over the ventilator rotor and mounting to the ventilator stator. The cover extends beyond the ventilator rotor, whilst the one or more wind-drivable elements remain substantially exposed to the wind in-use. Such a cover can provide protection to the ventilator, and blades, and assist in the prevention of particles entering the interior of the ventilator.

Reference herein to "wind-drivable elements" does not exclude the ventilator rotor being rotated by means other than the wind. For example, the ventilator rotor may also be driven by a motor, or by thermally generated gas currents exiting the enclosed space via the ventilator, or as a result of other gas pressurising means operating within the enclosed space (e.g. conditioned or heat-induced airflow). Also, "wind-drivable" means the element can be driven by the wind. The wind drivable element is typically a blade, as disclosed herein, although it may comprise another wind catchment device such as a vane, cup, sail-shape, etc.

In one form, the cover may be asymmetrical such that it extends further beyond the ventilator rotor on one side thereof. The cover projecting beyond the ventilator on one side can assist in preventing rain from entering the ventilator. This may be particularly useful when the ventilator is mounted such that the ventilator rotor is substantially parallel to the roofline. The cover can be mounted to the ventilator, such that it extends beyond the ventilator on the high-side of the roof. Such a configuration provides similar protection from particles, such as rain, on all sides of the ventilator whilst reducing the overall size of the cover.

The cover may comprise a central portion surrounded by an outer substantially concave portion. A cover having an outer concave portion can assist in the redirection of particles away from the interior of the ventilator. The outer concave portion can act as a trough, from which the particles can then be directed off the cover. The trough can also act to prevent the particles from escaping over the sides of the cover, and into the ventilator.

In one form, the central portion may be substantially convex. The central convex portion can also help direct particles into the outer concave portion, preventing accumulation of particles at the centre of the cover.

The ventilator and cover defined in the second aspect may be otherwise as defined above in the first aspect.

Also disclosed herein, in a third aspect, is a rotor ventilator. The ventilator comprises a ventilator stator for mounting to a structure. A typical structure to which the ventilator may be mounted is a roof, or wall etc, of an enclosed space of a building, or portable structure such as a shed, house, automobile, etc. It should be appreciated, however, that the ventilator may be mounted to another structure, or part thereof, such as a sub-floor structure. The ventilator also comprises a ventilator rotor for mounting and rotation with respect to the ventilator stator. The ventilator further comprises a cover for positioning over the ventilator rotor and mounting to the ventilator stator. The cover comprises a spout at an outer portion thereof. Such a cover provides a simple way for any particles, such as dust or water droplets, to flow off the cover and prevent a congregation of the particles thereat. The spout can also direct particles away from the interior of the ventilator, thus protecting internal rotary and or electrical components.

The cover may comprise a central portion surrounded by an outer substantially concave portion. A cover having an outer concave portion can assist in the redirection of particles away from the interior of the ventilator. The outer concave portion can act as a trough, from which the particles can then be directed off the cover at the spout. The trough can also act to prevent the particles from escaping over the sides of the cover, and into the ventilator.

In one form, part of the outer substantially concave portion of the cover may converge at a periphery of the cover to form the spout. The spout may preferably be located on the lower side of the roof-line in use (i.e. on an opposite side of the cover to the extending portion). The spout may be used to direct particles, such as water droplets from rain, which have contacted the cover to be directed off the cover and away from the ventilator. The combination of the trough, formed by the substantially concave portion, and the spout provides sufficient velocity to direct water off the cover, without it trickling into the interior of the ventilator.

The ventilator defined in the third aspect may be otherwise as defined above in the first or second aspects.

Also disclosed herein, in a fourth aspect, is a rotor ventilator. The ventilator comprises a ventilator stator for mounting to a structure. A typical structure to which the ventilator may be mounted is a roof, or wall etc, of an enclosed space of a building, or portable structure such as a shed, house, automobile, etc. It should be appreciated, however, that the ventilator may be mounted to another structure, or part thereof, such as a sub-floor structure. The ventilator also comprises a ventilator rotor for mounting and rotation with respect to the ventilator stator. The ventilator further comprises a cover for positioning over the ventilator rotor and mounting to the ventilator stator. The cover is asymmetrical such that it extends further beyond the ventilator rotor on one side thereof. Such a cover provides a simple way for any particles, such as dust or water droplets, to flow off the cover and prevent a congregation of the particles thereat.

The cover projecting beyond the ventilator on one side can assist in preventing rain from entering the ventilator. This may be particularly useful when the ventilator is mounted such that the ventilator rotor is substantially parallel to the roofline. The cover can be mounted to the ventilator, such that it extends beyond the ventilator on the high-side of the roof. Such a configuration provides similar protection from particles, such as rain, on all sides of the ventilator whilst reducing the overall size of the cover.

The ventilator defined in the fourth aspect may be otherwise as defined above in any one of the first to third aspects.

Also disclosed herein, in a fifth aspect, is a rotor ventilator cover. The cover comprises a central portion surrounded by an outer substantially concave portion. A cover having an outer concave portion can assist in the redirection of particles away from the interior of a ventilator to which it can be mounted. The outer concave portion can act as a trough, from which the particles can then be directed off the cover. The trough can also act to prevent the particles from escaping over the sides of the cover, and into a ventilator. In one form, the central portion may be substantially convex. The central convex portion can also help direct particles into the outer concave portion, preventing accumulation of particles at the centre of the cover.

In one form, a spout may be formed by part of the outer substantially concave portion of the cover converging at a periphery of the cover. The spout may preferably be located on the lower side of a roofline when a ventilator, to which the cover is mounted, is mounted to the roof such that its rotor is substantially parallel to the roofline (i.e. on an opposite side of the cover to the extending portion). The spout may be used to direct particles, such as water droplets from rain, which have contacted the cover to be directed off the cover and away from the ventilator. The combination of the trough, formed by the substantially concave portion, and the spout provides sufficient velocity to direct water off the cover, without it trickling into the interior of the ventilator.

In one form, the cover may be asymmetrical such that it extends further beyond the ventilator rotor on one side thereof. The cover projecting beyond the ventilator on one side can assist in preventing rain from entering the ventilator. This may be particularly useful when the ventilator is mounted such that the ventilator rotor is substantially parallel to the roofline. The cover can be mounted, such that it extends further beyond the ventilator on the high-side of the roof. Such a configuration may provide similar protection from particles, such as rain, on all sides of ventilator whilst reducing the overall size of the cover.

The rotor ventilator cover defined in the fifth aspect may be otherwise as defined above in any of the first to fourth aspects.

Also disclosed herein, in a sixth aspect, is a rotor ventilator cover. The cover is asymmetrical such that, when attached to a ventilator, it extends further beyond the ventilator rotor on one side thereof. Such a configuration can assist in preventing rain from entering the ventilator to which it is mounted, thus allowing the ventilator to be mounted so that the ventilator rotor is substantially parallel to the roofline. The cover can be mounted to the ventilator rotor, such that it extends further beyond the ventilator on the high-side of the roof. Such a configuration provides similar protection from particles, such as rain, on all sides of the ventilator whilst reducing the overall size of the cover.

The cover defined in the sixth aspect may be otherwise as defined above in any of the first to fifth aspects.

Also disclosed herein, in a seventh aspect, is a rotor ventilator cover. The cover comprises a spout at an outer portion thereof. The spout can assist in the removal of particles from the cover, and in preventing the particles from overflowing from the sides of the cover into the interior of the ventilator. The spout provides a directional dispersion of the particles, directing them away from the ventilator interior.

The cover defined in the seventh aspect may be otherwise as defined above in any one of the first to sixth aspects.

Also disclosed herein, in an eighth aspect, is a method of mounting a rotor ventilator to a pitched roof. The method comprises mounting the ventilator such that a rotor of the ventilator is substantially parallel to the pitch of the roof.

The ventilator, and cover therefor, employed in the method of the eighth aspect may be as defined above in any one of the first to seventh aspects.

Such an arrangement of the ventilator rotor being mounted such that it is parallel to the roofline has generally not before been possible, due to insufficient protection of the ventilator from environmental elements such as snow, rain, dust, etc. However, the ventilator and cover disclosed herein allow the ventilator, and the ventilator rotor, to be generally aligned with the pitch of the roof, thus utilising the wind more efficiently. As wind or air currents flow over a roof, the airflow will generally be parallel to the roof line. The blades of the rotor are therefore able to function more efficiently, as the airflow will strike the blade more directly than known natural or hybrid ventilators, which are required to be mounted such that their rotors are substantially parallel to the ground. Mounting the ventilator in this manner also lowers the profile of the ventilator, thus making it more discretely positionable on the roof.

BRIEF DESCRIPTION OF THE DRAWINGS

Notwithstanding any other forms that may fall within the scope of the rotor ventilator, rotor ventilator cover and method as set forth in the Summary, specific embodiments will now be described, by way of example only, with reference to the accompanying drawings in which:

FIGS. 5A and 5B show two sectional views of the ventilator cover embodiment of FIG. 4;

FIGS. 6A and 6B show back and front perspective views, respectively of a ventilator blade embodiment;

DETAILED DESCRIPTION OF SPECIFIC EMBODIMENTS

Figure 1:
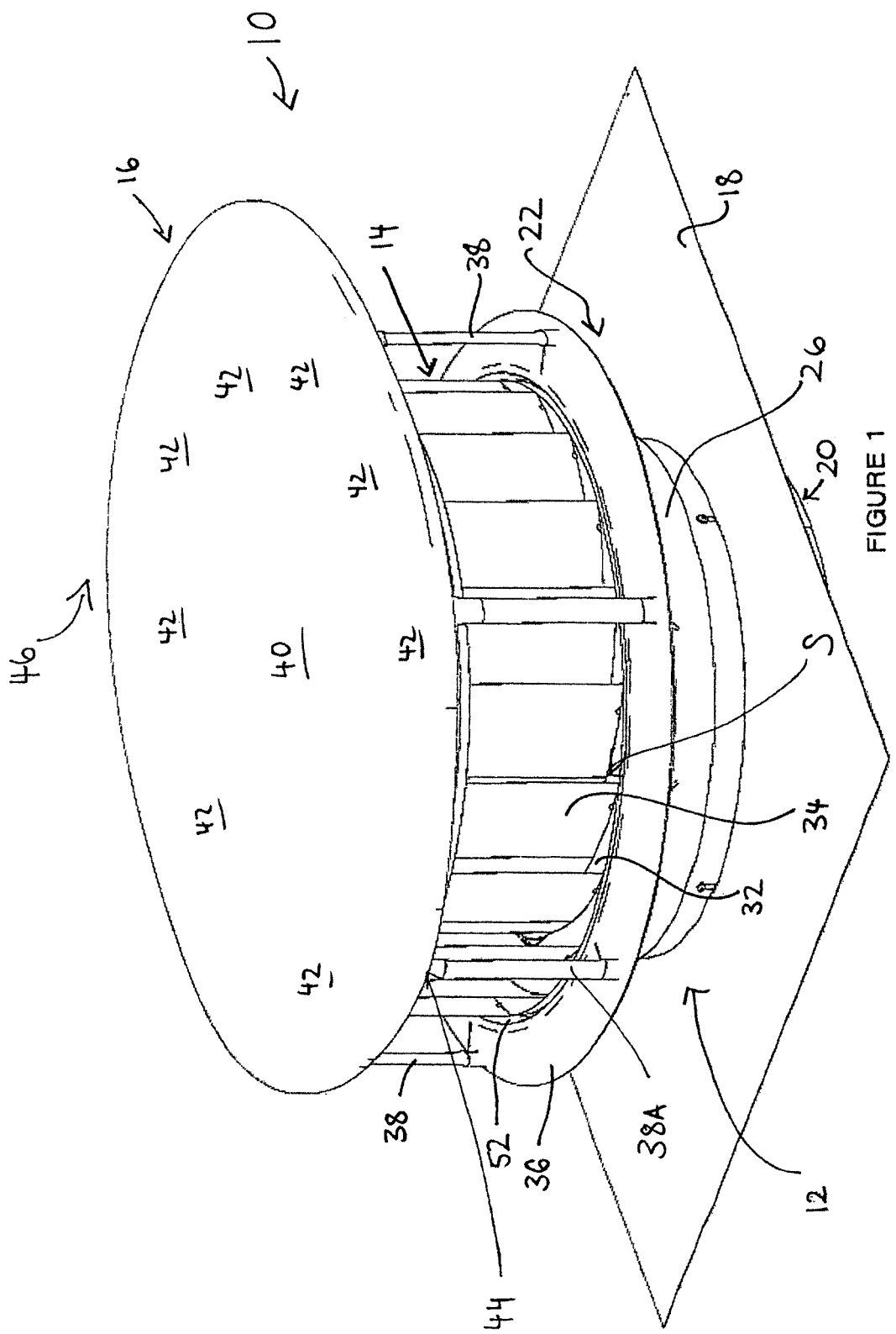
FIG. 1 shows a perspective view of a ventilator embodiment.
Figure 9:
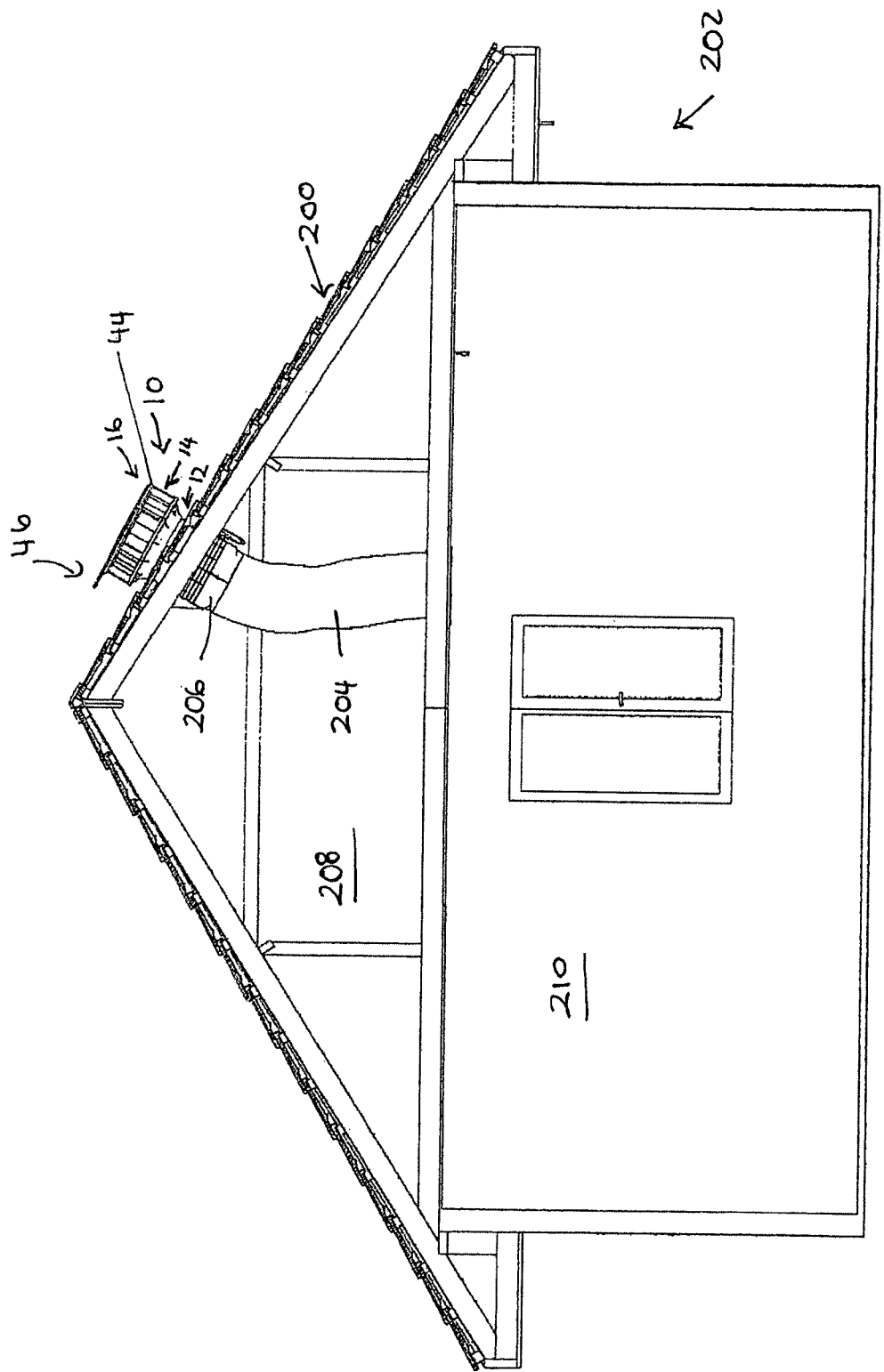
FIG. 9 shows a schematic view of a house incorporating the ventilator embodiment of FIGS. 1 to 4.

In the drawings, FIG. 1 shows an embodiment of a rotor ventilator 10. The ventilator 10 finds particular application as a roof-mounted ventilator, such as is shown in FIG. 9, though can be employed in other scenarios. The ventilator 10 shown comprises a ventilator stator 12, a ventilator rotor 14 and a cover 16. The stator 12 is shown mounted to flashing 18, which is used to prevent the passage of water into the structure to which the ventilator 10 is being mounted.

The ventilator stator 12 comprises a base 20 that is attached to the inside of, and extends below, the flashing 18. As best shown in FIG. 9, base 20, when ventilator 10 is mounted to the roof 200 of a house 202, can attach to ducting 204, or a diverter valve 206, or directly to a truss in the roof space 208, or (where there is no roof space) to a ceiling of a living space 210.

The ventilator stator 12 also comprises a body 22 that is formed by an inner wall 24 and an outer wall 26. The inner wall 24 attaches to an upstanding portion 28 of the flashing 18, with a narrow gap 30 maintained therebetween (for example, by spacers). The outer wall 26 extends from the inner wall 24, at a number of spaced braces 31, to be spaced from the inner wall 24 at an upper portion thereof. The braces 31 provide structural integrity to the body 22 and support the spaced location of outer wall 26. Further, the spacing between the inner and outer walls 24, 26 provides the necessary spacing for a rotor base plate 32, to which blades 34 are mounted, to rotate within the ventilator.

The outer wall 26 is also shown having a peripheral skirt 36 that extends downwardly to prevent rain that is reflected from, or bounces off, the roof 200 from entering the interior of the ventilator 10. At the outer periphery of the peripheral skirt 36, the ventilator 10 is shown having six mounts, in the form of struts 38, to mount the cover 16 to the stator 12. The struts 38 are of a length substantially corresponding to the height of the blades 34, so that the cover 16 does not obscure the blades (thus enabling the rotor ventilator 10 to be wind-driven). The peripheral skirt 36 spaces the struts 38 from the ventilator blades 34, thus allowing the cover 16, when attached to the struts 38, to generally overlie the blades 34 and protect them from direct rain impact. These struts 38 also act as a guide to direct water down the struts 38, away from the interior of ventilator 10.

Figure 4:
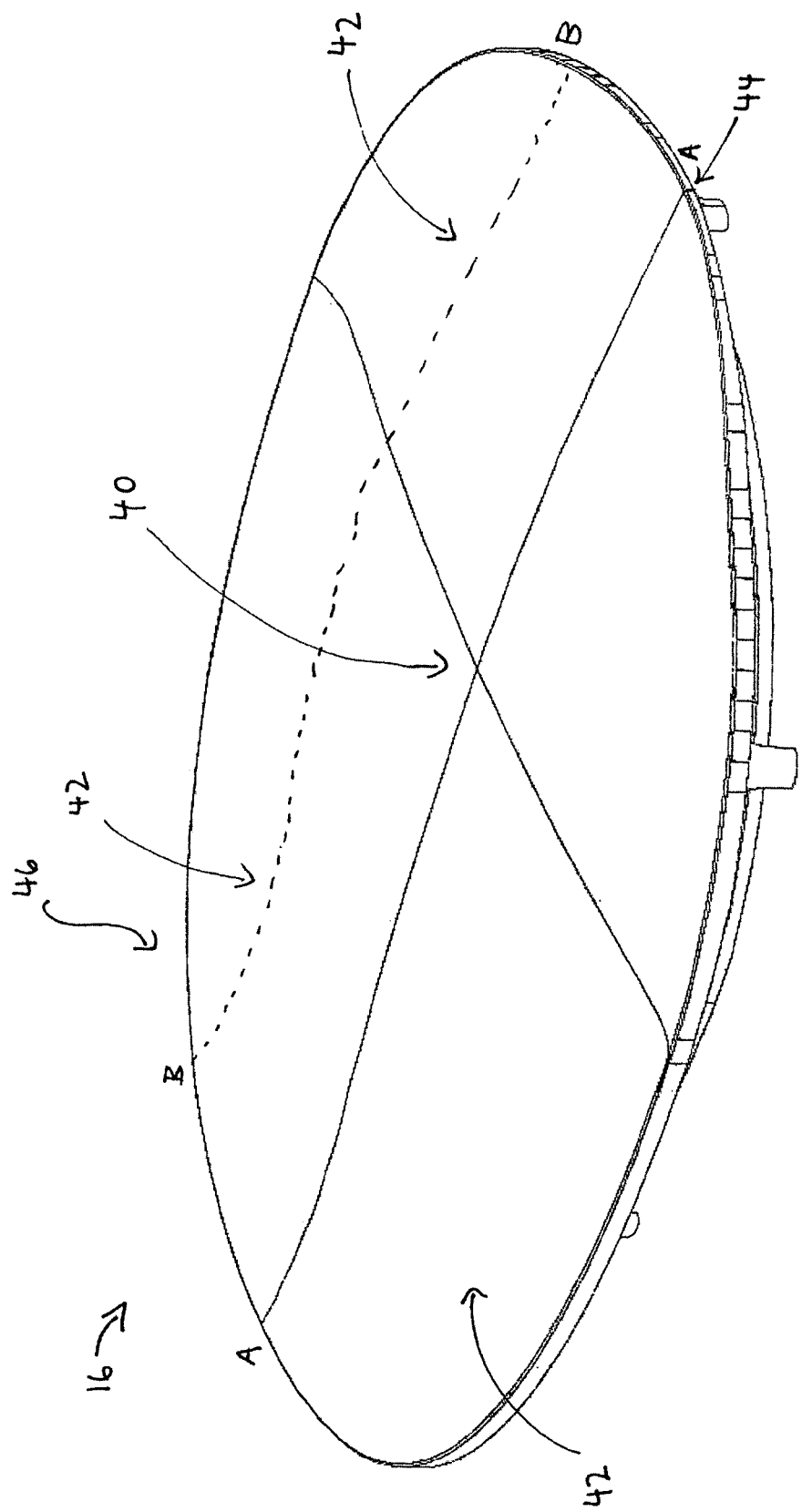
FIG. 4 shows a perspective view of a ventilator cover embodiment.

The cover 16, best shown in FIGS. 4, 5A and 5B, is shown having an asymmetrical configuration. The cover 16 provides protection to the ventilator 10 from environmental conditions/elements, such as rain. The cover 16 a central convex portion 40 surrounded by an outer substantially concave portion 42. The cover 16 also has a spout 44, which is formed by parts of the concave portion 42 converging at a periphery of the cover 16. The cross sections of the cover 16, shown in FIGS. 5A and 5B, are taken on the lines A-A and B-B shown in FIG. 4. The spout 44 is formed on the part of the cover 16 which is designed to overlie the blades 34, as opposed to the extended portion 46 of the cover 16 that extends beyond the blades 34 (see FIG. 7), thus making the cover 16 asymmetric.

The spout 44 is designed to be located on the low side of the ventilator 10, and the extended portion 46 is designed to be located on the high side of the ventilator 10 when it is mounted to the roof 200, as shown in FIG. 9. This allows the ventilator 10 to be mounted roof 200 such that the rotor 14 is substantially parallel to the roof line. This lowers the profile of the ventilator 10, and also makes the ventilator more efficient as airflow from the wind will generally follow the roofline and hit the blades 34 more directly than in known ventilators.

The outer concave portion 42 of the cover 16 can act as a trough to direct the flow of water to the spout 44, increasing the velocity of the water to allow it to be propelled off the cover 16, to prevent it leaking into the interior of the ventilator 10. Strut 38A is substantially aligned with the spout 44, thus guiding any water which has insufficient velocity to be propelled off and away from the cover 16 down the strut 38A, away from the interior of ventilator 10.

Each strut 38 is also shown having a web 48 that can direct water down the internal surface of outer wall 26, and out through an opening 50 in the lower portion of the outer wall 26. A spacing 52 is provided between the peripheral skirt 36 and the rotor base plate 32 for blades 34 to allow water at the strut 38 to be directed down the internal surface of outer wall 26 and out of opening 50 to the exterior of ventilator 10, to drain down roof 200 to guttering of the house 202. Braces 31 may also be used to guide water to openings 50.

A plurality of blades 34 are mounted to the rotor base plate 32 of the ventilator rotor 12. The blades 34 each comprise a front blade face 54 and a back blade face 56. The blade 34 also comprises a leading edge 58, which is located in the interior of the ventilator 10, and a trailing edge 60 which is located at the outer portion of the ventilator 10 and is directly contacted by the wind, etc. The trailing edge 60 is shown having an aerodynamic profile 62.

Figure 2:
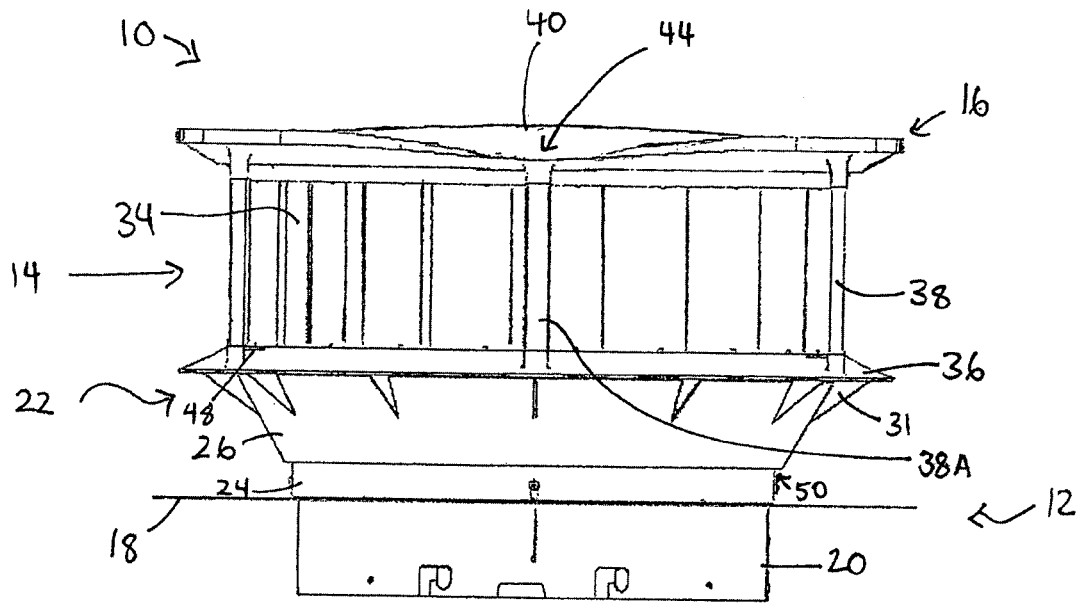
FIG. 2 shows a front view of the ventilator embodiment of FIG. 1.
Figure 3:
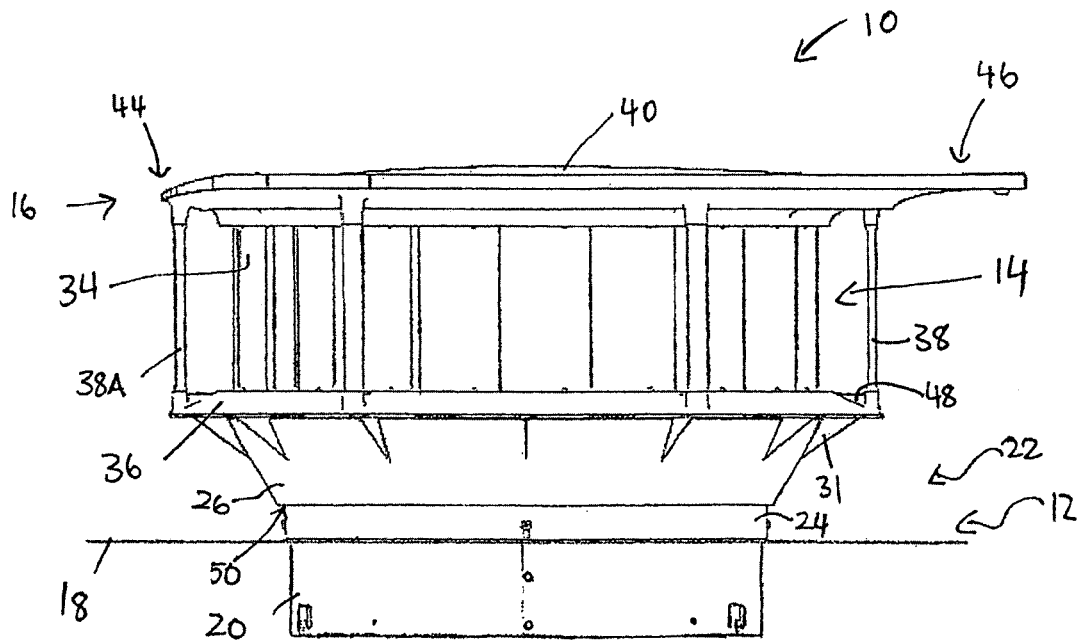
FIG. 3 shows a side view of the ventilator embodiment of FIGS. 1 and 2.
Figure 7:
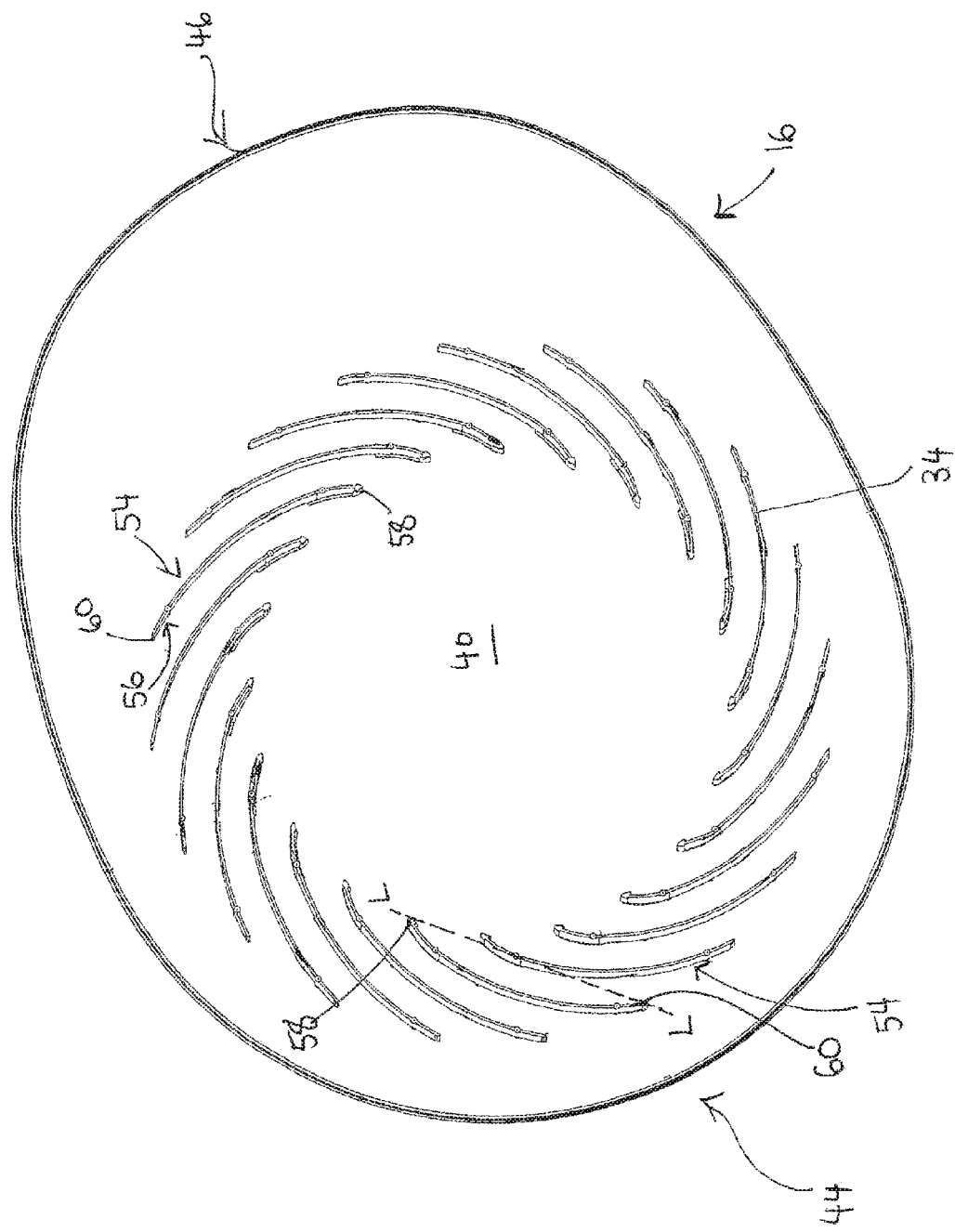
FIG. 7 shows a schematic view of the cover embodiment shown in FIGS. 4 and 5 that overlies the arrangement of the ventilator blades.

As best shown in FIGS. 2, 3 and 7, the blades 34 are positioned to substantially overlap with adjacent blades 34 such that, when the ventilator 10 is viewed in a sectional plan view and a line L-L (FIG. 7) is taken extending between the leading edge 58 and trailing edge 60 of the blade 34, the line L-L is unable to extend uninterruptedly into an interior of the ventilator 10. The line L-L is shown intersecting with the front blade face 54 of an adjacent blade 34. This can prevent particles, such as rain, debris, dust, ambient light, etc, from directly entering the ventilator, as the particles are not able to pass directly through the spacing S between adjacent blades 34. This forces the water to strike one of the faces 54, 56 of the various blades 34, before entering the ventilator 10.

In the embodiment shown, the leading edge 58 comprises first and second lips 64, 66, respectively, extending along its length on the back and front blade faces 56, 54, respectively. The first and second lips extend to form the leading edge with an aerodynamic profile 68. Whilst this embodiment shows the leading edge 58 of the blade 34 having two such lips 64, 66, the blade may only have one such lip 64. It is preferable where only one such lip 64 is employed, that the lip be positioned on the back blade face, as more water is likely to enter the ventilator on this blade side. Further, whilst this embodiment shows the second lip 66 as being narrower than the first lip 64, the lips may be of comparable dimensions.

Figure 8:
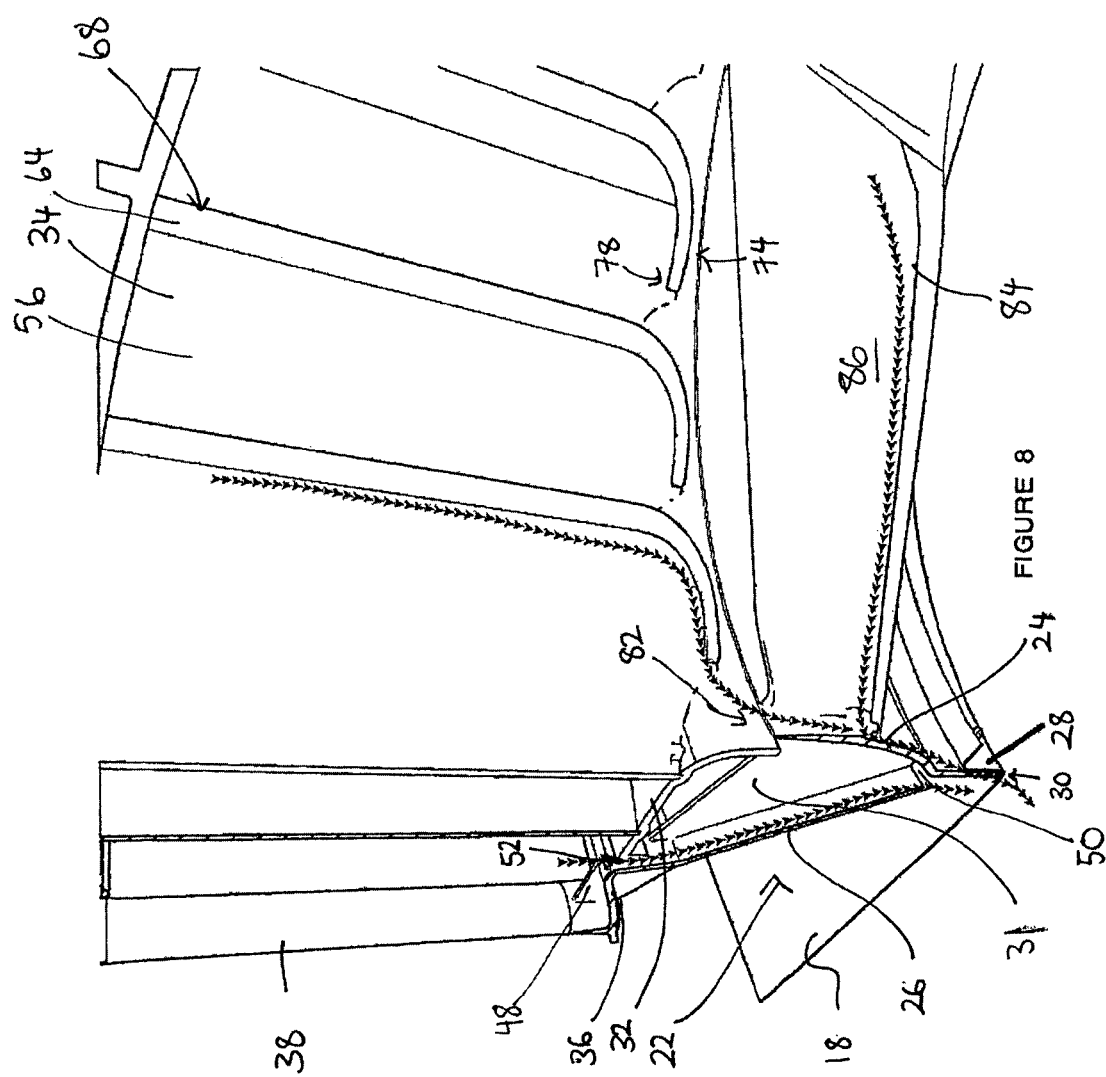
FIG. 8 shows a partial internal view of the ventilator embodiment of FIGS. 1 to 3.

The lips 64, 66 are shown in FIGS. 6A and 6B as being integrally formed with the blade 34 and forming a channel 70, 72, or groove, between the respective lips 64, 66 and the respective back and front blade faces 56, 54. The lips 64, 66 provide a surface to obstruct the normal flow of particles, such as droplets of water. The channels 70, 72 are used to control and direct the flow of the water and prevent it from entering the interior of the ventilator 10 in an uncontrolled manner. The lips 64, 66 may be used to redirect the particles to a specific part of the ventilator 10 interior, as shown in FIG. 8.

The lips 64, 66 are also shown extending the same distance along a portion 74 of an underside edge 76 of the blade 34. Whilst not shown, the ends 78, 80 of the lips 64, 66 may be shaped to streamline the flow of water off the blade 34. FIG. 8 shows the flow path of the water travelling down lips 64, 66 and being directed past the ends 78, 80 of lips 64, 66.

The ends 78, 80 of lips 64, 66 are approximately aligned with a channel, in the form of drainage channel 82, along the inner wall 24. A similar drainage channel 84 may be provided along each of the bearing or motor support arms, shown in the form of stator arms 86. The drainage channels 82, 84 are designed to direct the water to flow down the inner wall 24 of the stator body 22. As mentioned above, the inner wall 24 attaches to an upstanding portion 28 of the flashing 18, with a narrow gap 30 maintained therebetween (for example, by spacers). This allows the water to drain from the interior of ventilator 10 to the exterior of the ventilator along the drainage channel 82, 84, down the inner wall 24 and out the ventilator through the gap 30 between the inner wall 24 and the upstanding portion 28 of the flashing 18.

Example

A non-limiting Example of a rotor ventilator and a method of mounting the ventilator will now be described, with reference to the various embodiments as shown in FIGS. 1 to 9.

A rotor ventilator 10 was mounted to the roof 200 of a house 202 such that the rotor 14 (i.e. blades 34 on rotor base plate 32) was substantially parallel to the roof line. A lower portion of base 20 was connected to a diverter valve 206, which was in turn connected to ducting 204. The ducting 204 was connected to a vent in the living space 208 of the house 202. The ventilator 10 had a cover 16 with an asymmetrical portion 46 that extended beyond the rotor 14 on the high side of the roof 200. The cover also had a spout 44 which was located on the low side of the roof 200. The cover 16 also had a central convex portion 40 surrounded by a substantially concave portion 42, with the concave portion converging at a periphery of the cover to form the spout 44.

It was observed that when it rained, the interior of the ventilator 10 remained substantially dry, with little or no rain entering the interior of the ventilator.

Rain that fell on the cover 16 was observed to flow from the convex portion 40 to the concave portion 42, and follow the path of the concave portion to the spout 44 at the low end of the cover 16. The water was then propelled off the cover 16 via the spout 44. Due to the outer part of the concave portion 42, water was unable to spill over the sides and into the interior of the ventilator 10.

Water that was not of a sufficient velocity coming off the spout 44 was guided by strut 38A to drip off of the peripheral skirt 36 onto the roof, or via web 48 to flow through spacing 52 and down the internal surface of outer wall 26 to exit the ventilator 10 via the opening 50 between the outer wall 26 and the inner wall 24.

Water that struck the roof 200 and bounced back up towards the ventilator 10 was observed to be prevented from entering the interior of the ventilator by the downwardly angled peripheral skirt 36. Any water that struck the skirt 36 remained on the outside of the ventilator 10 and drained away along the roof 200.

Some water that struck the blades 34 was observed to be removed from the blades by the centrifugal forces of the blades spinning. Remnant water on the blades was observed to primarily collect on the back blade faces 56, with minimal accumulation of water on the front blade faces 54. The water on each of the faces was observed to flow towards the leading edge 58. The channels 70, 72 formed between the lips 64, 66 and the back and front blade faces 56, 54, respectively, guided the water down to their ends 78, 80. The water flowed from the ends 78, 80 down inner wall 24 and out of the ventilator via the narrow gap 30 between the flashing 18 and the inner wall 24.

It will be understood to persons skilled in the art that many other modifications may be made without departing from the spirit and scope of the rotor ventilator, rotor ventilator cover and method as disclosed herein.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the rotor ventilator, rotor ventilator cover and method.

The invention claimed is:

1. A roof-mounted rotor ventilator comprising:
   a ventilator stator structure configured to be mounted on a roof of a building;
   an interior configured to be connected to a space within the building;
   a ventilator rotor rotatably supported by the ventilator stator, the ventilator rotor comprising one or more wind-drivable elements; and
   a cover mounted to and fixed relative to the ventilator stator and positioned over the ventilator rotor, such that the rotor rotates relative to the cover, and such that the one or more wind-drivable elements remain substantially exposed to the wind in-use,
   wherein the cover comprises a central portion surrounded by an outer portion that is substantially concave when viewed from above,
   wherein part of the outer substantially concave portion of the cover converges at a periphery of the cover to form a spout.

2. The ventilator as claimed in claim 1, wherein the central portion is substantially convex when viewed from above.

3. The ventilator as claimed in claim 1, wherein the cover is asymmetrical such that it extends further beyond the ventilator rotor on one side thereof.

4. The ventilator as claimed in claim 1, further comprising one or more mounts for mounting the cover to the ventilator stator.

5. The ventilator as claimed in claim 1 further comprising one or more mounts for mounting the cover to the ventilator stator, wherein the spout is substantially aligned with one of the mounts.

6. The ventilator as claimed in claim 1, wherein the ventilator stator further comprises a peripheral skirt extending therearound.

7. The ventilator as claimed in claim 6 further comprising one or more mounts for mounting the cover to the ventilator stator, wherein the mounts extend from the peripheral skirt for the cover to mount thereto.

8. The ventilator as claimed in claim 1, further comprising a channel extending from the interior of the ventilator to an exterior of the ventilator.

9. The ventilator as claimed in claim 8, wherein the channel extends along a bearing or motor support arm to a base wall of the ventilator stator.

10. The ventilator as claimed in claim 8, wherein the ventilator stator is mounted to the building to form a spacing therebetween, such that the channel extends to the spacing and to the exterior of the ventilator and building.

11. The ventilator as claimed in claim 1, wherein the rotor comprises a plurality of blades positioned and configured such that, when the ventilator is viewed in side profile, a line of sight into the interior of the ventilator is substantially restricted or obstructed.

12. The ventilator as claimed in claim 11, wherein the blades are positioned such that, when the ventilator is viewed in a sectional plan view and a line is taken extending between leading and trailing edges of each said blade, the line is unable to extend uninterruptedly into an interior of the ventilator.

13. The ventilator as claimed in claim 12, wherein the line intersects with a front blade face of an adjacent blade.

14. The ventilator as claimed in claim 11, wherein the blades are positioned such that, when viewed in side profile, each blade substantially overlaps with an adjacent blade.

15. The ventilator as claimed in claim 11, wherein each blade comprises front and back blade faces and leading and trailing edges, wherein the leading edge comprises a first lip extending along its length on the back blade face.

16. The ventilator as claimed in claim 15, wherein a channel is formed between the first lip and the back blade face.

17. The ventilator as claimed in claim 15, wherein the first lip extends along a portion of an underside edge of the back blade face.

18. The ventilator as claimed in claim 15, wherein the first lip is integrally formed with the blade.

19. The ventilator as claimed in claim 15, wherein the leading edge further comprises a second lip, extending along its length on the front blade face.

20. The ventilator as claimed in claim 19, wherein a channel is formed between the second lip and the front blade face.

21. The ventilator as claimed in claim 19, wherein the second lip extends along a portion of an underside edge of the front blade face.

22. The ventilator as claimed in claim 19, wherein the second lip is narrower than the first lip.

23. The ventilator as claimed in claim 19, wherein the first and second lips extend the same distance along the back and front blade faces, respectively.

24. The ventilator as claimed in claim 19, wherein the second lip is integrally formed with the blade.

25. The ventilator as claimed in claim 19, wherein the first and second lips extend so as to form the leading edge as an aerodynamic edge.

26. The ventilator as claimed in claim 19, wherein the trailing edge comprises an aerodynamic profile at the front blade face.

27. A roof-mounted rotor ventilator cover, the cover comprising a central portion surrounded by an outer portion that is substantially concave when viewed from above and wherein, when the cover is attached to a stator of the roof-mounted rotor ventilator and positioned over a ventilator rotor that is rotatably supported by the stator, one or more wind-drivable elements of the ventilator rotor remain substantially exposed to the wind in-use, wherein part of the outer substantially concave portion of the cover converges at a periphery of the cover to form a spout.

28. The cover as claimed in claim 27, wherein the central portion is substantially convex when viewed from above.

29. The cover as claimed in claim 27, wherein the cover is asymmetrical such that, when attached to the stator of the roof-mounted rotor ventilator, said cover extends further beyond the ventilator rotor on one side thereof.

30. A method of mounting a rotor ventilator to a pitched roof, the rotor ventilator comprising a ventilator stator and a ventilator rotor rotatably supported by the ventilator stator, the ventilator rotor comprising one or more wind-drivable elements that are substantially exposed to the wind in-use, the method comprising mounting the ventilator stator to the pitched roof such that the ventilator rotor of the rotor ventilator is substantially parallel to the roof, wherein the rotor ventilator comprises a cover, said cover comprising a central portion surrounded by an outer portion that is substantially concave when viewed from above, said cover configured to be mounted to the ventilator stator and positioned over the ventilator rotor such that the one or more wind-drivable elements remain substantially exposed to the wind in-use, wherein part of the outer substantially concave portion of the cover converges at a periphery of the cover to form a spout.

31. The ventilator as claimed in claim 1, wherein the ventilator interior is connected to the space within the building via a valve.

32. The ventilator as claimed claim 1, wherein the ventilator interior is connected to the space within the building via ducting.

* * * * *